(12) United States Patent
Berger et al.

(10) Patent No.: US 6,510,931 B2
(45) Date of Patent: Jan. 28, 2003

(54) METHOD OF OPERATING A TORQUE TRANSFER SYSTEM

(75) Inventors: Reinhard Berger, Bühl (DE); Martin Vornehm, Bühl (DE); Stefan Winkelmann, Bühl (DE)

(73) Assignee: LuK Lamellen und Kupplungsbau Beteiligungs KG, Buhl (DE)

( * ) Notice: Subject to any disclaimer, the term of this patent is extended or adjusted under 35 U.S.C. 154(b) by 0 days.

(21) Appl. No.: 10/012,700

(22) Filed: Dec. 7, 2001

(65) Prior Publication Data

US 2002/0088681 A1 Jul. 11, 2002

Related U.S. Application Data

(63) Continuation of application No. PCT/DE00/01829, filed on Jun. 2, 2000.

(30) Foreign Application Priority Data

Jun. 8, 1999 (DE) ......................................... 199 26 023

(51) Int. Cl.[7] ............................................. F16H 61/26
(52) U.S. Cl. ...................... 192/3.58; 192/3.63; 701/67
(58) Field of Search ............................. 192/3.58, 3.56, 192/3.57, 3.63, 109 F; 477/79, 78; 701/53, 67, 68

(56) References Cited

U.S. PATENT DOCUMENTS 5,455,767 A * 10/1995 Staerker ..................... 192/3.58
5,993,352 A * 11/1999 Kosik et al. ................ 192/3.63
6,001,044 A * 12/1999 Amendt ........................ 701/67
6,105,448 A *  8/2000 Borschert et al. ............. 74/335
6,170,623 B1 *  1/2001 Eismann et al. ........... 192/3.56
6,230,862 B1 *  5/2001 Reik et al. ................. 192/3.56
6,250,448 B1 *  6/2001 Salecker et al. .............. 477/78

FOREIGN PATENT DOCUMENTS

| DE | 197 23 394 A | 12/1997 |
| DE | 198 23 050 A1 | 12/1998 |
| EP | 0 310 387 | 4/1989 |
| EP | 0 599 511 A1 | 6/1994 |
| GB | 2 351 130 A | * 12/2000 |

* cited by examiner

Primary Examiner—Rodney H. Bonck
(74) Attorney, Agent, or Firm—Darby & Darby (57) ABSTRACT

A torque transfer system, particularly an automated shift transmission of a motor vehicle, has a movable shifter element that is subject to a position-dependent force. The gear positions of the transmission correspond to minima of potential energy of the position-dependent force, so that the movable element will have a tendency to fall into the nearest one of the shift positions. To perform a gear shift, the movable shifter element is moved into the vicinity of the targeted gear position by means of a control device directing a shift actuator. When the movable shifter element has stopped moving within a given tolerance band of the targeted position, the control device generates a stall-releasing signal, e.g., a series of pulses of alternating polarity to overcome a holding force or holding torque of the movable element, so that the latter will seek a position of minimum potential energy and thus move towards the targeted gearshift position.

43 Claims, 7 Drawing Sheets

METHOD OF OPERATING A TORQUE TRANSFER SYSTEM

CROSS REFERENCE TO RELATED APPLICATION

This application is a continuation of International Application No. PCT/DE00/01829, filed Jun. 2, 2000, and which is incorporated herein by reference in its entirety.

BACKGROUND OF THE INVENTION

The present invention relates to a method of operating a torque transfer system in a motor vehicle, and it also relates to a torque transfer system that is capable of operating according to the inventive method.

A torque transfer system in the sense of the present invention is an arrangement with the capability to convert a characteristic rotary quantity of an input shaft into an either identical or different rotary quantity of an output shaft and/or with the capability to couple and uncouple the input shaft and the output shaft. As the term is used in the present context, a torque transfer system can include a clutch device and/or transmission device and/or a torque converter device or any other mechanism in the same general category.

A characteristic rotary quantity is used to characterize the dynamic situation of a rotating part, particularly a shaft. Specific examples of characteristic rotary quantities are a torque or an rpm rate.

A transmission device in the sense of the present invention is a mechanism that can be shifted in steps or in a continuous, step-less range, into different shift positions corresponding to different transmission ratios between two shafts of the transmission device. The transmission device can be shifted automatically or manually, or in a partially automatic or automated mode with the possibility of manual intervention.

A transmission device in the sense of the present invention encompasses in particular manually operated step-shifting transmissions, or cone-pulley transmissions, or automatic transmissions. An automatic transmission is a transmission device in which the shifts are controlled automatically and occur without interruption in the tractive force, specifically with a planetary gear mechanism. The transmission in the present context is configured in particular as an automated shift transmission. The term "automated shift transmission" relates to a transmission device in which the shift movements are automated, but are accompanied by an interruption in vehicle traction.

A clutch device in the sense of the present invention may be configured with or without power branching and can include a start-up clutch, a friction clutch, a reverse-gear clutch, a laminar disc clutch, a magnet-powder clutch, a converter bypass clutch, or another device of the same general category.

With special preference, the clutch is configured as an electronically controlled clutch device in which the movement between different positions of the clutch can be performed under electronic control. An electronically controlled clutch device has been described by and is available from the assignee of the present invention under the name "Electronic Clutch Management (ECM)".

In particular, an electronically controlled clutch device of the foregoing description has the capability of operating in a crawl mode.

A crawl mode in the sense of the present invention is an operating mode where the clutch is held in a position to transmit a predetermined amount of crawl torque. A crawl torque in the present context means in essence a small amount of torque that is transmitted through the clutch, e.g., while the engine is running, the brake is not applied, and the gas pedal or other fuel-metering device is being actuated. The crawl torque is transmitted also when a gear is set in the transmission of the motor vehicle. In particular, a crawl mode is controlled by a control device in accordance with a predetermined characteristic which can include mathematical functions, curve fields, or other functional relationships.

A transmission device in the sense of the present invention includes in particular a control device, an actuating device, and a shifting device. The shifting device has at least two movable elements, in particular a shifter finger as a first shifter element, and a shifter shaft or shifter fork as a second shifter element.

The first shifter element can be moved in a shift gate arrangement with at least one selector track and at least one shift track. The selector track and the shift tracks in the sense of the present invention may be real or virtual tracks. A virtual track means that the movement of the first shifter element is not constrained by physical guide barriers, but is nevertheless limited within certain track-like paths. The limitations or constraints on the movement may be realized by elements that are coupled to the first shifter element. The arrangement may include travel-delimiting devices which can be part of a control device or an actuating device.

The shift gate arrangement can have a configuration where the shift tracks join the selector track at right angles. In particular, the shift gate arrangement may be configured with three or four parallel shift tracks that meet the selector track at different selector positions.

A shift track in the sense of the present invention consists either of one branch that runs in one direction from a selector position on the selector track, or two branches that run in opposite directions from a selector position on the selector track.

Torque transfer systems with transmission devices, including automated shift transmissions, belong to the known state of the art and are commercially available.

However, experience has shown that automated shift transmissions in particular are more prone to wear, which often causes components to fail prematurely. Also, in known devices the shift movements into certain positions are not performed with the degree of precision given by a control device.

OBJECT OF THE INVENTION

It is therefore the object of the present invention to provide a method of operating a torque transfer system in a motor vehicle, and to provide a torque transfer system that is capable of operating in accordance with the inventive method, so that the precision of the shift movements is improved and the amount of wear is reduced in a cost-effective and technically non-complicated manner.

SUMMARY OF THE INVENTION

To meet the foregoing objective, the invention proposes a method of operating a torque transfer system in a motor vehicle. The torque transfer system includes a shifter device with a movable element that is movable into a plurality of shift positions, an actuator device to apply an actuating force to the movable element, a control device to control the actuator device, and a position-detecting device to detect a position of the movable element. The movable element is subject to a position-dependent force, and the shift positions coincide with minima of the potential energy of the position-dependent force. As a result, the movable element has a tendency to fall into the nearest one of the shift positions.

In a first step of the inventive method, an output signal is issued by the control device to the actuator device with the end purpose of moving the movable element to a targeted shift position or more specifically, to a position within a given first tolerance band of the target position. When the movable shifter element has arrived within a second tolerance band that is wider than the first tolerance band and contains the latter, the movement of the shifter element stops at least for a short time interval. The stop can be the result of two or more forces canceling each other at a specific point. Specifically, one of the forces is a position-dependent field force of a force potential, while at least one other of the forces is a holding force of the movable element that counterbalances the field force. Under the inventive method, the targeted shift position is located essentially at a point where the force potential has a local maximum or minimum, i.e., where the field force reverses its direction.

In a second step of the inventive method, a stall-releasing signal is generated by the control device in accordance with a predetermined characteristic, to overcome the holding force on the movable shifter element at least partially to allow the shifter element to move and to ensure that the shifter element settles at a final position within the first tolerance band of the targeted position.

In specific embodiments of the invention, the output signal is transmitted to the actuating device and the latter, in turn, applies a force to the movable shifter element or to a component that is coupled to the movable shifter element. The output signal may also consist of a sequence of two or more signals following each other.

The method can include detecting the position of the movable element or of the component that is coupled to the movable element. The detecting function can be performed by the position-detecting device. Preferably, the movement and position of the element are detected by way of other quantities, e.g., an electrical current or voltage. As soon as the movable shifter element has essentially attained the targeted shift position or arrived within a tolerance band of the target position, an output signal is generated by the control device to stop the movable shifter element for at least a short time interval.

A stop of the movable element in the sense of the present invention means that the velocity of the movable element in relation to the torque transfer system equals zero for at least a short time interval. A velocity of zero also includes a reversal of direction, where the velocity of the movable element changes from a positive to a negative value or vice versa.

The position-dependent field force or force potential is, at least in principle, not limited to any specific force-generating effect or device. Preferred is a force field or force potential that is generated by means of a mechanical spring. Preferred is a concept where the movable shifter element, or a component coupled to the latter, has a contour curve or contour surface. A push rod or other contact element is force-biased by a pre-tensioned spring against the contour curve. As the contour curve moves with the movable shifter element or component, the contact element glides or rolls in spring-loaded contact along the contour curve. In preferred embodiments, the element with the contour curve or contour surface is a shifter shaft or a component coupled to the latter. Preferably, the contour has indentations or depressions corresponding to predetermined shift positions of the transmission, so that the cooperation between the contact element and the contour curve tends to bias the movement towards the nearest depression of the contour.

The depressions in the contour correspond in particular to the positions of the gear levels and the neutral position of the transmission. When the spring-loaded contact element is at the lowest point of a depression in the contour, the potential energy of the spring is at a minimum, so that the biasing force exerted on the movable element or component (which is obtained as the first derivative of the potential energy) reverses direction at the deepest point of the depression.

With the foregoing concept, the movable shifter element can be set precisely at the targeted positions, usually the gear-level positions and the neutral position of the transmission, even if the actuator device has not moved the shifter element precisely to the targeted gear position. When the actuator device ceases to exert a force on the shifter element, the latter will on its own seek the nearest minimum of the spring force potential, i.e., the targeted gear position. However, under certain conditions, for example due to friction, the spring force between the contact element and the contour curve may not be sufficient to drive the shifter element to the position of minimum potential energy. The shifter element will be held in a non-relaxed state in which the spring force and an opposed holding force cancel each other, so that the shifter element will be stalled and not move to the precise target position.

To break out of the stalled condition and overcome the holding force, a signal is generated in accordance with a predetermined characteristic to produce a force on the shifter element. This stall-release signal can be generated by the control device. As a result of the stall-release signal and the force produced by it, the shifter element will move to the nearest precise position of minimum potential energy.

The invention has the advantage that it allows the transmission device to be moved into predetermined positions of minimum potential energy, i.e., force-free positions. Internal stress forces that may be caused by a stalled position of a shifter element at any point between the control device and the last element in the chain of mechanical components, i.e., the gears of a shift transmission, can be eliminated or neutralized by the method according to the invention. This reduces the wear on components of the transmission, so that the useful life of the transmission and its parts will be longer. In addition, the invention allows a highly accurate absolute adjustment of the position-detecting device.

An absolute adjustment in the present context means that a shifter element is moved to an absolute reference position within the shift gate arrangement either at the occurrence of certain events or at predetermined time intervals. With the shifter element at the reference position, the position detecting device is set to a predetermined value. The reference position is a uniquely defined shift position to which the shifter element can be moved without requiring the position-detecting device to be working precisely.

A preferred embodiment of the present invention consists of a method of performing an absolute adjustment based on moving a shifter element to a position corresponding to a local minimum of a potential energy field, i.e., a point where the field force reverses direction.

The invention allows absolute positions to be determined independent of temperature, load cycles, or other influence factors.

In a further embodiment of the invention, the method is somewhat simplified: In a first step, an output signal is generated by the control device to move the movable shifter element to a predetermined targeted shift position or at least close to the latter. In a second step, a release signal is generated by the control device in accordance with a predetermined characteristic, to overcome the holding force on the movable shifter element so that the latter will position itself in a tension-free rest position.

According to the invention a first output signal is generated according to a predetermined characteristic with the result that a movable element of the transmission is moved to a predetermined targeted shift position or at least close to it, specifically to a position within a preliminary or second tolerance band.

When the movable element has reached the target position or a point close to it, a second output signal is generated by the control device to push the movable element free of its preliminary, stalled position and into an essentially force-free rest position.

According to a preferred embodiment of the invention, the second signal or stall-releasing signal is issued only if the movable element is close to, but not precisely at, the targeted shift position. The position of the movable element is monitored by the position-detecting device.

According to a particularly preferred embodiment of the invention, the stall-releasing signal is issued also in cases where the position-detecting device indicates that the targeted shift position has been attained. Taking this measure will prevent in particular that the movable element will remain in a stalled condition at some distance from the targeted position if the position detecting device gives an erroneous signal that the movable element is in the targeted position when this is not actually the case.

According to a particularly preferred embodiment of the invention, a stall-releasing signal is issued if the movable element has been found to be at a limit stop that is close to the targeted shift position. Since all shift positions correspond to energy minima, the potential energy decreases from the limit stop towards the targeted shift position. The stall-releasing signal can have the effect that the movable element will follow the path of least resistance, i.e., of decreasing potential energy, to move to the targeted shift position. In particular, the force produced as a result of the stall-releasing signal may overcome the holding force that opposes the minimum-seeking force of the potential energy field.

Also among the highly preferred embodiments is a concept to ascertain that if the movable element is found at a limit stop, this condition is intended, i.e., not due to a stalled condition of the movable element.

Further among strongly preferred embodiments of the invention is a concept where the value of a predetermined characteristic parameter is monitored and/or evaluated and a stall-releasing signal is generated dependent on the predetermined characteristic parameter or the time profile of the characteristic parameter. The characteristic parameter is in particular a parameter of the transmission device or of the clutch device, or a parameter of the motor vehicle in general. In particular, the parameter is an operating parameter whose value can change during operation of the vehicle or of the transmission device or clutch device.

With particular preference, the characteristic parameter is an electric parameter such as an electric current or voltage.

In a preferred embodiment of the invention, the control device sends an electrical signal to the actuator device which, in response, applies a force to the shifter device. In particular, the electrical signal consists of an electrical voltage that is applied to the actuator device. With special preference, the actuator device works with a selector motor and a shift motor, and the control device applies voltages to these two motors which will be referred to herein as selector voltage and shift voltage. As a consequence of the selector voltage and shift voltage, corresponding currents will flow in the respective motors. In addition, an overall total current can be defined as the current that flows from the control device to the actuator device.

With particular preference, at least one of the currents is monitored against a voltage that is set by the control device (voltage controlled method). The voltage set by the control device can be a constant voltage, or it can be variable according to a predetermined characteristic.

With a voltage-controlled process, it is preferred according to the invention to monitor the electric current as a function of time. The current that is monitored is the sum total of the current supplied by the control device and/or the current supplied to the selector motor and/or the current supplied to the shift motor, and/or some other current of the transmission device. A particular purpose of monitoring a current is to determine from the current fluctuation over time if a movable element of the actuator device or the shifter device changes its impedance to the current. As a result of the variable impedance, the movable element may move at different speeds even if the opposing mechanical force is the same. A change in impedance can also be caused by a mechanical limit stop or by the absence of a limit stop.

When the movement of the movable element is opposed by an increasing mechanical resistance, this will manifest itself through an increase in the actuating current, while a decreasing mechanical resistance will manifest itself through a decrease in the actuating current. The fact that the movable element has reached a limit stop may be recognized from a strong increase in current. Projections and depressions in the surface contour of the movable element that interacts with the spring-loaded contact element manifest themselves through local maxima and minima in the profile of the electric current.

According to the invention, local minima (representing depressions in the surface contour) are correlated to the gear levels and the neutral position of the transmission. In other words, a position where the contact element is at the bottom of a depression in the surface contour corresponds to one of the gear levels or the neutral position of the transmission.

When the movable shift element or a component coupled to the latter is approaching a gear level position or the neutral position and is within a predetermined range of the exact position, this can be recognized from the change in the current signal.

With preference, a stall-releasing signal is generated after the monitored characteristic quantity (i.e., the current) has increased or decreased longer than a predetermined time interval and/or by more than a predetermined amount, and after it has been ascertained that the movable element is at least close to the targeted shift position. The purpose of ascertaining that the movable element is at least in close proximity to the targeted shift position is to prevent that a minimum in the current profile is correlated with an incorrect gear position.

The aforementioned ascertainment can be realized in a variety of ways, e.g., by means of a position-detecting device or by long-term monitoring of the current signals.

According to a preferred embodiment of the invention, a stall-releasing signal is generated after detecting that the monitored quantity, i.e., the monitored current, has passed through a local minimum. Preferably, this includes a check that the minimum has not already been followed by a maximum.

Preferably, the position of the movable element is monitored by a position-detecting device, and a stall-releasing signal is generated if the position-detecting device indicates that the movable element is at least in the proximity of the targeted shift position.

According to a particularly preferred embodiment of the invention, a stall-releasing signal is generated if the movable element is in the proximity of the targeted shift position but not at the precise local minimum of the potential energy field, or if the contact element is not at a local minimum of the surface contour.

Immediately after the stall-releasing signal, an actuating force is applied to the movable element in the opposite direction of the force that was driving the element prior to the stall-releasing signal. However, the range of preferred solutions also includes applying at least initially an actuating force in the same direction as the force that was driving the movable element prior to the stall-releasing signal.

Preferably, the stall-releasing signal has the effect that the movable element is subjected at least initially to an actuating force in the direction towards the targeted shift position. The direction from the current position of the movable element towards the targeted shift position can be determined from the time profile of the current or by means of a position-detecting device.

If the movable element is found stalled in a position close to a limit stop, it is preferable to at least initially apply a force that is directed away from the limit stop.

With particular preference, an output signal is generated to move the movable element towards a limit stop, in particular towards an end stop of a shift track. The condition where further movement of the movable element is blocked by the end stop can be detected from the time profile of the current or by means of a position-detecting device. Subsequently, a stall-releasing signal is generated to apply a force to move the element away from the end stop.

Preferably, the stall-releasing signal is substantially not a pulse signal. Specifically, the signal consists of a voltage that stays constant for a predetermined time interval or until a predetermined event occurs, or it can be variable over time in accordance with a predetermined characteristic. With preference, the stall-releasing signal is a signal other than a pulse, causing a small amount of force to be applied to the movable element. In particular, the force can be of a magnitude between zero and double the amount of holding force by which the further movement of the moving element has been opposed. Preferably, the stall-releasing signal is set at least part of the time at a level where the force on the movable element corresponds substantially to the holding force or is smaller than the holding force by which the movement of the element is being opposed.

Preferably, the stall-releasing signal is a voltage other than a pulse that is applied to an electric motor or other element of the actuating device, of a magnitude between 0.3 volt and 2.5 volt, preferably between 0.4 volt and 1.7 volt, and with special preference between 0.5 volt and 1.5 volt.

The stall-releasing signal can at least reduce the magnitude of inherent holding forces that may be due, e.g., to the holding torque of an electric motor used for the shifter and/or selector actuation, or other holding forces acting on a movable element of the actuator or shifter device.

According to a particularly preferred embodiment of the invention, the stall-releasing signal that is applied to an electric motor used for the shifter and/or selector actuation is a voltage other than a pulse, and is less than the minimum voltage required to cause the motor to move.

In other preferred embodiments, the signal is a pulse signal.

The pulse signal can have a plurality of successive pulses of alternating polarity.

The pulsed stall-releasing signal has the effect that the movable element is subjected to one or more forces of substantially alternating direction.

With preference, the pulsed stall-releasing signal consists of voltage pulses.

The voltage pulses and the force pulses generated by them can be of equal or different magnitude and of equal or different length. The pulse repetition time, i.e., the time between two consecutive pulses or the period between two identical pulses can be constant or variable.

Preferably, the voltage pulses that immediately follow each other have opposite polarity and identical duration. The generation of the stall-releasing signal is maintained until a predetermined characteristic value moves back and forth between a first position and a second position.

The aforementioned characteristic value can be the shift position or the speed of movement of a movable element of the shifter device or actuator device. The value can also be the magnitude of a current such as the total current flowing in the control device or in the actuator device, or the current of a motor of the shifter and/or selector actuation. In particular, the back-and-forth movement between the first and second postion occurs in such a manner that at least one of the two positions is attained at least twice in succession. It is particularly preferred if the characteristic value as a function of time reaches a lower first position, then a higher second position, then the same first position again. Also among the preferred possibilities, the characteristic value as a function of time may run from a higher first position to a lower second position and back again to the higher first position. It is particularly preferred to keep generating the stall-releasing signal until the predetermined characteristic value has attained the same high position at least a first number of consecutive times and the same low position at least a second number of consecutive times, with the first and second number being either equal or different by one count. Further among the preferred possibilities, the alternating stall-releasing signal is kept up until the characteristic value as a function of time has alternatingly attained the same high and low positions for at least a predetermined length of time.

According to the inventive method, as soon as the characteristic value as a function of time runs back and forth symmetrically in the manner described above, this is interpreted as an indication that the movable element or a component coupled to it is in a substantially force-free or non-stalled shift position.

With preference, the pulsed stall-releasing signal consists of voltage pulses of alternating polarity in which the product of voltage and pulse duration is determined according to a predetermined characteristic. The predetermined characteristic in this case is in particular a function of a predetermined characteristic value such as a friction force or a coefficient of friction.

Preferably, the pulses are generated at a high frequency.

Also as a preferred concept, the position-detecting device detects and/or monitors the position of the movable element or a component coupled to the element during the time when the stall-releasing signal is in effect.

According to a preferred embodiment of the invention, the position-detecting device is checked or adjusted or adapted under predetermined conditions at a time when a predetermined targeted shift position has been attained after a stall-releasing signal, i.e., when the movable element is in a substantially force-free or non-stalled position.

A particular embodiment of the inventive method of operating the torque transfer device is designed as an emergency strategy that is initiated under certain conditions and under which the movable element is moved successively to different predetermined target positions identified by a running index k that is incremented from 1 to n in steps of 1. At each of the n target positions, the inventive method is used according to one or more of the embodiments described above. The same embodiment of the invention may be used identically for all of the shift positions, or different embodiments or versions of the inventive method may be correlated with the different positions.

Further included in the scope of the invention is a torque transfer system that is configured with the required capabilities to perform the inventive method according to any of the embodiments or versions of the method as described herein.

Also included in the scope of the invention is any method of operating a motor vehicle that includes utilizing the method or torque transfer system of the present invention.

As a linguistic formality, where the names of features are connected by the word "or", this should be understood in the broadest sense, i.e., either as a logic type of or (one or the other or both) or an exclusive or (one or the other but not both), whichever fits the context.

The terms "control" and "regulation" and their derivatives are used herein with a broad range of meanings encompassing closed-loop as well as open-loop control of devices, functions and processes, including in particular the DIN (Deutsche Industrie-Norm) definitions for regulation and/or control).

The novel features that are considered as characteristic of the invention are set forth in particular in the appended claims. The inventive method itself, however, both as to its mode of operation and its application in a motor vehicle, together with additional features and advantages thereof, will be best understood upon perusal of the following detailed description of certain presently preferred specific embodiments with reference to the accompanying drawing.

BRIEF DESCRIPTION OF THE DRAWINGS

Embodiments of the invention are described below as examples only, and no limitations are thereby implied. The description refers to the attached drawings, wherein.

DETAILED DESCRIPTION OF THE INVENTION

Figure 1:
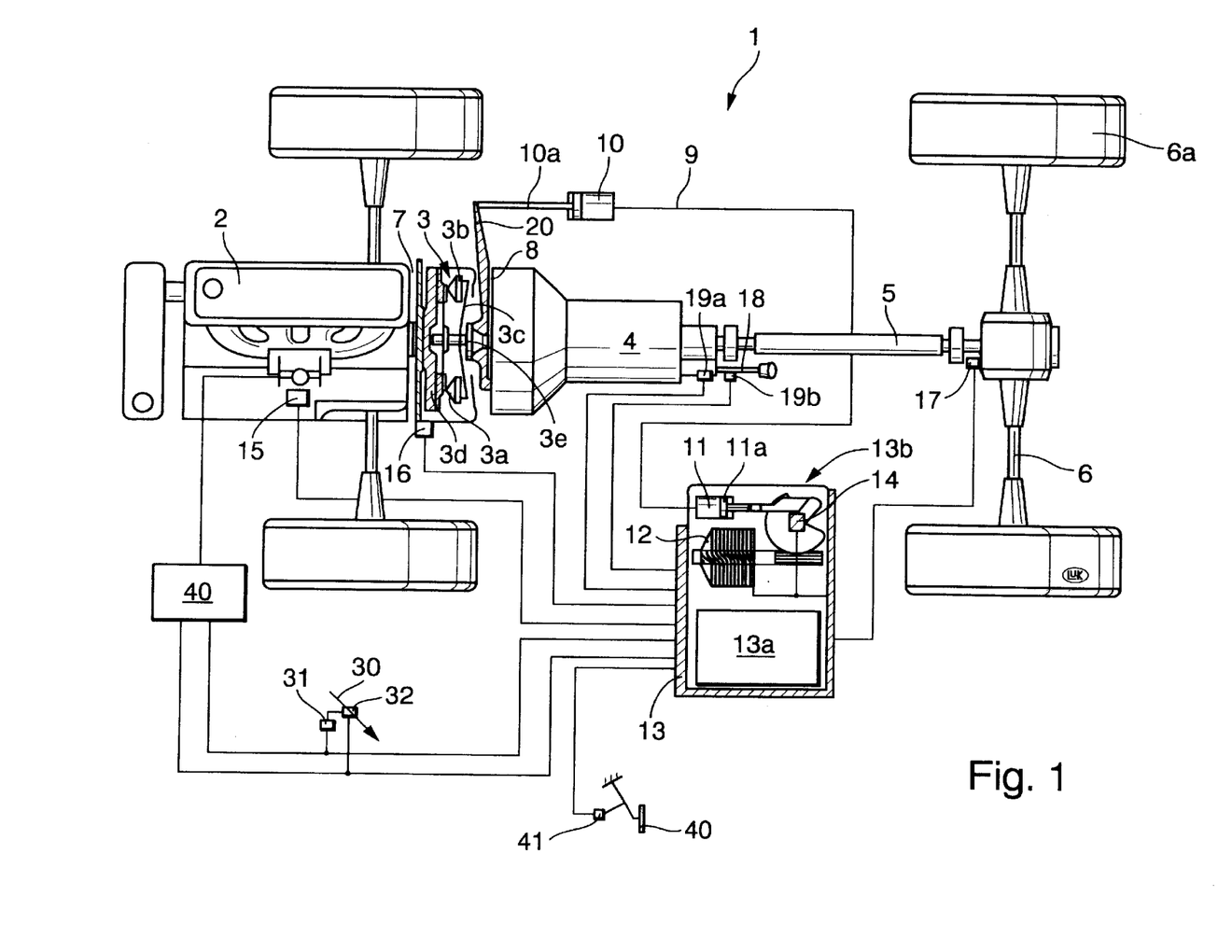
FIG. 1 represents a first exemplary embodiment of the invention in a schematic view.

FIG. 1 gives a schematic view of a vehicle 1 with a drive unit 2 such as a motor or combustion engine. The power train of the vehicle further contains a torque-transmitting device 3 and a transmission 4. The illustrated example shows the torque-transmitting device 3 arranged in the torque flow path between the engine and the transmission, so that the driving torque generated by the engine is passed on by way of the torque-transmitting device 3, the transmission 4, the drive shaft 5, and the driving axle 6 to the wheels 6a.

The torque-transmitting device 3 is configured as a clutch, such as a friction clutch, laminar disc clutch, magnet powder clutch, or converter bypass clutch. The clutch may be of the self-adjusting, wear-compensating type. The transmission 4 is shown as a manual shift transmission in which the transmission ratio is changed in steps. However, under the concept of the invention, the transmission may also be an automated shift transmission in which the shifting process is automated by means of at least one actuator. The term "automated shift transmission" further means an automated transmission of a type where the tractive force is interrupted during gear shifts and where the shifting from one transmission ratio to another is performed by means of at least one actuator.

It is also possible to use a conventional automatic transmission of the type that works without interrupting traction during gear shifts and is normally based on planetary gear stages.

As a further possibility, a transmission with a continuously variable transfer ratio, such as for example a cone-pulley transmission, may be employed in embodiments of the invention. If a conventional automatic transmission is used, the latter may be equipped with a torque-transmitting device 3, e.g., a clutch or friction clutch, arranged at the output side of the transmission. The torque-transmitting device can further be configured as a start-up clutch and/or as a reverse-gear clutch and/or as a safety clutch in which the magnitude of the transmittable torque can be controlled at a targeted level. The torque-transmitting device can be a dry friction clutch, or a so-called wet-running friction clutch that runs in a fluid, or it may consist of a torque converter.

The torque-transmitting device 3 has an input side 7 and an output side 8. A torque is transmitted from the input side 7 to the output side 8 through a contact force that is applied to the clutch disc 3a by means of the pressure plate 3b, the diaphragm spring 3c, the release bearing 3e, and the flywheel 3d. The force is generated by an actuator pushing or pulling the release lever 20.

The torque-transmitting device 3 is controlled by means of a control unit 13 which may be configured as a control device with an electronic module 13a and an actuator 13b. In another advantageous embodiment, the actuator and the electronic module may also be accommodated in two separate subassembly units or housings.

The control unit 13 may contain the electronic circuits for the control as well as for the power supply of the electric motor 12 of the actuator 13b. This has the advantage that only one compact portion of space is needed for both the actuator and the electronics. The actuator consists of a motor 12, typically an electric motor driving a hydraulic master cylinder 11 through a gear mechanism such as a worm gear mechanism, a spur gear mechanism, a crank mechanism, or a threaded spindle mechanism. The master cylinder may be driven directly or by way of a rod linkage.

The movement of the output element of the actuator, i.e., of the piston 11a of the master cylinder 11, is detected by a clutch travel sensor 14 which senses a position, or the speed or acceleration of a change in position, of an element whose displacement, speed or acceleration is in direct proportion to the displacement, speed or acceleration of the clutch. The master cylinder 11 is connected through a pressure conduit 9, normally a hydraulic line, to the slave cylinder 10. The output element 10a of the slave cylinder is coupled to the release lever or release element 20. Thus, a movement of the output element 10a of the slave cylinder 10 causes the release element 20 to be moved or tilted to effect a controlled variation of the amount of torque that is transmitted by the clutch 3.

The actuator 13b that controls the torque-transmitting device 3 may be based on a pressure-propagation principle, using a master cylinder and slave cylinder communicating through a pressure medium. The pressure medium can be a hydraulic fluid or a pneumatic medium. The master cylinder may be driven by an electric motor 12 that is electronically controlled. However, instead of an electric motor, the driving element of the actuator 13b may also be based on another drive source, e.g., driven by hydraulic pressure. It is also conceivable to use magnet-based actuators to set a position of an element.

The amount of torque transmitted through a friction clutch is controlled to a targeted level by applying pressure on the friction linings of the clutch disc between the flywheel 3d and the pressure plate 3b. The force that is exerted on the pressure plate and on the friction linings is controlled by the position of the release element 20, whereby the pressure plate is moved to or set and held at any position between two end positions. One end position represents a fully engaged condition of the clutch, and the other end position represents a fully disengaged condition. To set the transmittable torque at an amount that is less than the current engine torque, the pressure plate 3b is moved to a position that lies in an intermediate range between the end positions. By controlling the release element 20 to a set target, the clutch can be held at the targeted position. However, it is also possible to set the transmittable torque above the level of the current engine torque. In this case, the torque generated by the engine is passed on by the clutch, while torque fluctuations, especially abrupt peaks in the torque flow, are damped and/or isolated.

The control and regulation of the torque-transmitting device further relies on sensors which at least part of the time monitor the relevant factors and provide the status data, signals and measurement values that are necessary for the control and are processed by the control unit. The latter may also have communication lines to other electronic units such as, e.g., an electronic engine control unit, or an electronic control of the anti-lock braking system (ABS), or an anti-slip regulation (ASR). The sensors detect, for example, rpm rates of the vehicle wheels or of the engine, the position of the gas pedal, the position of the throttle valve, the currently engaged gear level of the transmission, driver-generated inputs that indicate an impending gear change, and other characteristic information specific to the vehicle and the operating situation.

FIG. 1 shows a throttle valve sensor 15, an engine rpm sensor 16, as well as a vehicle speed sensor 17, which relay measurement data and information to the control device. The electronic unit, such as a computer unit that is part of the control unit 13a, is processing the incoming data and issues control commands to the actuator 13b.

The transmission is configured as a step-shifting transmission, in which the transmission ratio is shifted in discrete, fixed steps by means of a shift lever. The shift lever may operate or actuate the transmission directly. There is further at least one sensor 19b arranged at the shift lever 18 of the manual shift transmission, which serves to detect when the driver intends to shift gears and/or which gear is currently engaged, and to relay the information to the control device. The sensor 19a is connected to the transmission and serves to detect the currently engaged gear of the transmission and/or to detect a condition that indicates that the driver is about to shift gears. The detection of the driver's intent to shift gears can be realized through the use of at least one of the sensors 19a, 19b, if the sensor is a force sensor that responds to a force acting on the shift lever. Alternatively, the sensor could also be a position sensor or displacement sensor, in which case the control unit would recognize an intent to shift gears from a dynamic change of the position signal.

The control device is at least part of the time in signal communication with all of the sensors and evaluates the sensor signals and input data which, in their totality, are referred to as the current operating point of the torque transfer system. Based on the operating point, the control device issues control and regulation command signals to the at least one actuator. The drive element 12 of the actuator, such as an electric motor, operates under the command of the control unit that controls the actuation of the clutch by means of a command signal that depends on the measurement values and/or the system input data and/or signals of the sensors. The control device has a control program in the form of hardware and/or software, which evaluates the incoming signals and calculates or determines the output quantities based on comparisons and/or functions and/or characteristic data arrays or curve fields.

The control unit 13 is advantageously equipped with units or modules for the determination of torques, gear positions of the transmission, amounts of slippage in the clutch, and/or different operating states of the vehicle, or there are signal connections from the control unit 13 to at least one of the aforementioned modules. The modules or units may be implemented in the form of control programs in hardware and/or software. As a result, the incoming sensor signals allow a determination of the torque of the drive unit 2 of the vehicle 1, the gear position of the transmission 4, the amount of slippage in the torque-transmitting device, as well as the current operating state of the vehicle. The gear-position determining unit detects which gear is currently engaged based on the signals from the sensors 19a and 19b. The sensors are coupled to the shift lever and/or to internal mechanical elements of the transmission such as, e.g., a central shifting shaft or shifting rod, to detect the position or movement of these elements. There can further be a gas pedal sensor 31 arranged at the gas pedal 30 to detect the position of the latter. A further sensor 32 may consist of a binary on/off switch to indicate when the engine is idling, i.e., the switch 32 is on when the gas pedal is not being depressed, and it is off when the gas pedal is being actuated. The gas pedal sensor 31, in contrast to the on/off switch 32, provides a quantitative signal representing the degree of actuation of the gas pedal.

Further in FIG. 1, a brake-actuating element 40 is shown which serves to apply the service brake or the parking brake.

This can be a brake pedal, a hand-brake lever, or a hand- or foot-operated actuating element of the parking brake. At least one sensor 41 is arranged at the actuating element 40 to monitor the actuation of the latter. The sensor 41 may be a digital sensor, e.g., a binary switch for detecting whether the actuating element is in an applied or non-applied state. This sensor may be connected to a signal device such as a brake indicator light to alert the driver that the brake is applied. This arrangement can be used for the service brake as well as for the parking brake. However, the sensor can also be configured as an analog sensor, e.g., as a potentiometer that measures the degree of displacement of the actuating element. This sensor, likewise, can be connected to an indicator signal.

Figure 2:
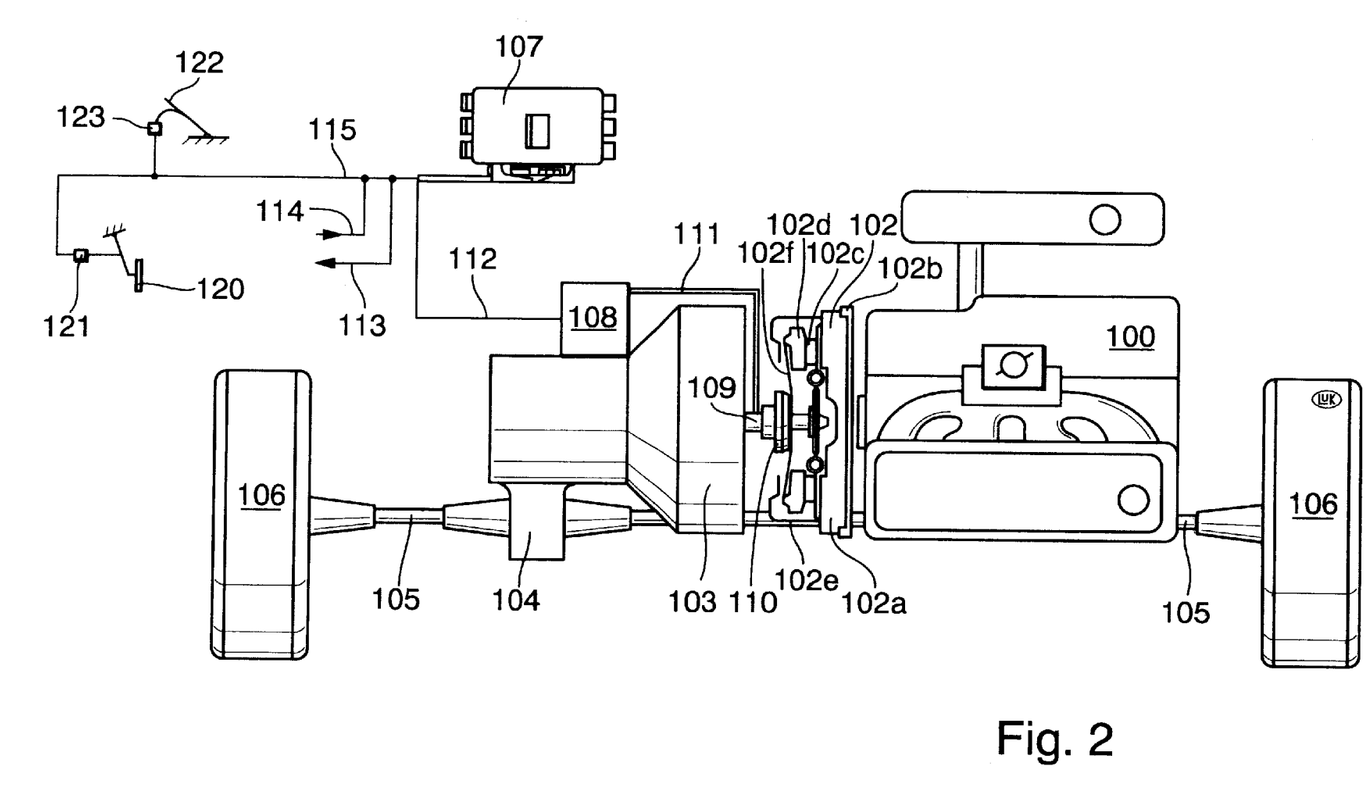
FIG. 2 represents a second exemplary embodiment of the invention in a schematic view.

FIG. 2 gives a schematic view of a power train of a motor vehicle with a drive unit 100, a torque-transmitting device 102, a transmission 103, a differential 104, drive axles 105, and wheels 106. The torque-transmitting device 102 is arranged at or connected to a flywheel 102a. The latter as a rule carries an external tooth profile 102b that serves to start the engine. The torque-transmitting device has a pressure plate 102d, a clutch cover 102e, a diaphragm spring 102f, and a clutch disc 102c with friction linings. The clutch disc 102c is interposed between the pressure plate 102d and the flywheel 102a and may be equipped with a damping device. An energy-storing device such as a diaphragm spring 102f pushes the pressure plate axially towards the clutch disc. A clutch-actuating element 109 such as a hydraulically actuated concentric slave cylinder is used to actuate the torque-transmitting device. A release bearing 110 is arranged between the concentric slave cylinder and the prongs of the diaphragm spring 102f. As the release bearing is moved along the axial direction, it pushes against the diaphragm spring and thereby disengages the clutch. The clutch may be configured either as a push-actuated clutch or a pull-actuated clutch.

The actuator module 108 belongs to an automated shift transmission and includes the actuator unit for the torque-transmitting device. The actuator module 108 operates internal shifter elements such as, e.g., a shift-actuating cylinder or a rod mechanism, or a central shifter shaft of the transmission. The actuation may work in a manner where the gears can be engaged and disengaged in sequential order or in an arbitrary order. The clutch-actuating element 109 is operated by way of the connection 111. The control unit 107 is connected to the actuator through the signal line 112. The control unit 107 is further connected by signal lines 113 to 115. The signal line 114 carries incoming signals. The line 113 carries command signals issued by the control unit. The connection 115, consisting for example of a data bus, exchanges signals with other electronic units.

To put the vehicle in motion or to accelerate the vehicle from a stationary or slow rolling condition, the driver has to use only the gas pedal 30, as the controlled or regulated automatic clutch actuation controls the amount of transmittable torque of the torque-transmitting device. The degree of depression of the gas pedal is detected by the gas pedal sensor 31, and the control unit will accordingly implement a more or less forceful or rapid start-up acceleration. The sensor signals from the gas pedal are used as inputs for the control of the start-up phase of the vehicle.

In a start-up phase, the amount of transmittable torque is set as a control target by means of a given function or on the basis of characteristic curves or curve fields that may be functions of the engine rpm rate. The latter may in turn be dependent on other quantities such as the engine torque, that are correlated to the engine rpm rate through a characteristic relationship.

In a start-up process, essentially from a stationary or crawl-speed condition, if the gas pedal is actuated by an amount a, the engine control device will direct the engine to generate an engine torque of a certain magnitude. The control unit of the automated clutch actuation 13 controls the transmittable torque of the torque-transmitting device in accordance with given functions or characteristic curve fields, so that a stationary equilibrium sets in between the engine torque and the clutch torque. The equilibrium is characterized dependent on the gas pedal displacement a by a specific start-up rpm rate, a start-up torque generated by the engine, a specific amount of transmittable torque of the torque-transmitting device, and a specific amount of traction torque delivered to the drive wheels. The functional relationship between the start-up engine torque and the start-up rpm rate will subsequently be referred to as the start-up characteristic. The gas pedal displacement a is proportionate to the aperture of the throttle valve of the engine.

Further in FIG. 2, a brake-actuating element 120 is shown which serves to apply the service brake or the parking brake. This can be a brake pedal, a hand-brake lever, or a hand- or foot-operated actuating element of the parking brake. At least one sensor 121 is arranged at the actuating element 120 to monitor the actuation of the latter. The sensor 121 may be a digital sensor, e.g., a binary switch for detecting whether the actuating element is in an applied or non-applied state. This sensor may be connected to a signal device such as a brake indicator light to alert the driver that the brake is applied. This arrangement can be used for the service brake as well as the parking brake. However, the sensor can also be configured as an analog sensor, e.g., as a potentiometer that measures the degree of displacement of the actuating element. This sensor, likewise, can be connected to a signal indicator device.

Figure 3:
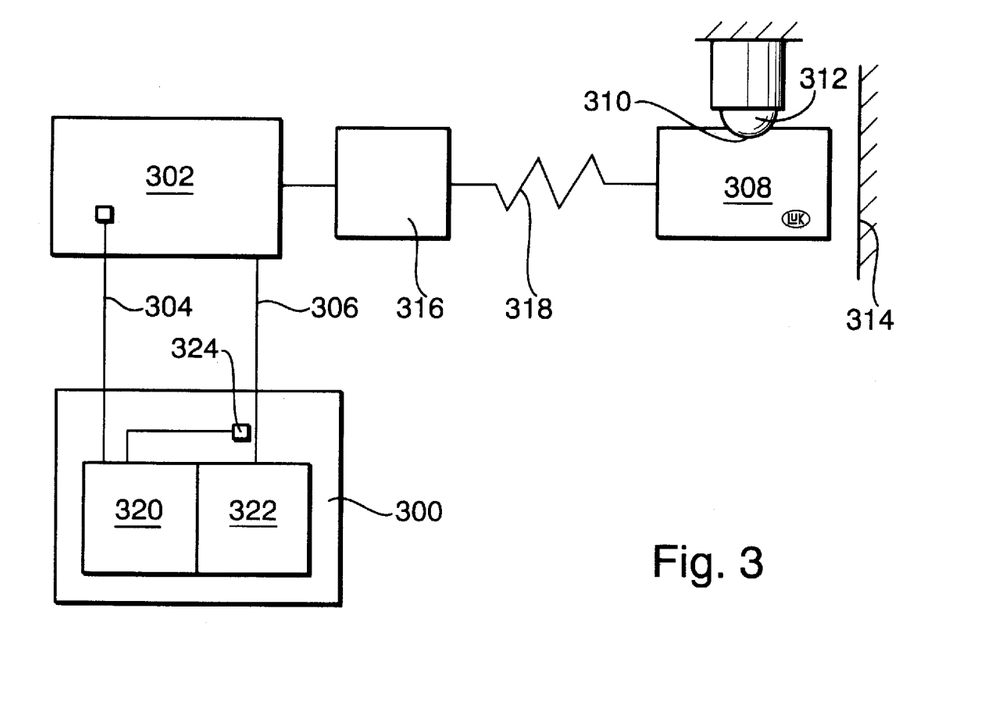
FIG. 3 represents a third exemplary embodiment of the invention in a schematic view.

FIG. 3 represents a block diagram of a transmission device that can be operated according to the inventive method. A control device 300 with a process computer 320 and a power supply portion 322 is connected to an electric motor 302 through signal and power lines 304, 306. The electric motor 302 is part of an actuator device and is used either for the shifter or selector actuation of a transmission. Through a transfer mechanism 316, the electric motor transmits a torque or force to a first movable element 308 of the transmission. The mechanical transfer path further includes an elastic element indicated schematically as a spring 318.

The first movable element 308 has a surface contour with raised and depressed portions schematically represented by the depression 310. A spring-loaded contact element 312 applies a force against the contoured surface. The schematically indicated border 314 represents a limit stop for the movement of the first movable element 308.

The electric motor contains a position sensor based on an incremental principle to detect the position of the first movable element 308. The sensor transmits a position-indicating signal through the signal connection 304 to the process computer 320. The power supply portion 322 provides power to the electric motor 302 through the power connection 306. The electric current flowing through the connection 306 may be monitored by a current-measuring device 324.

Figure 4:
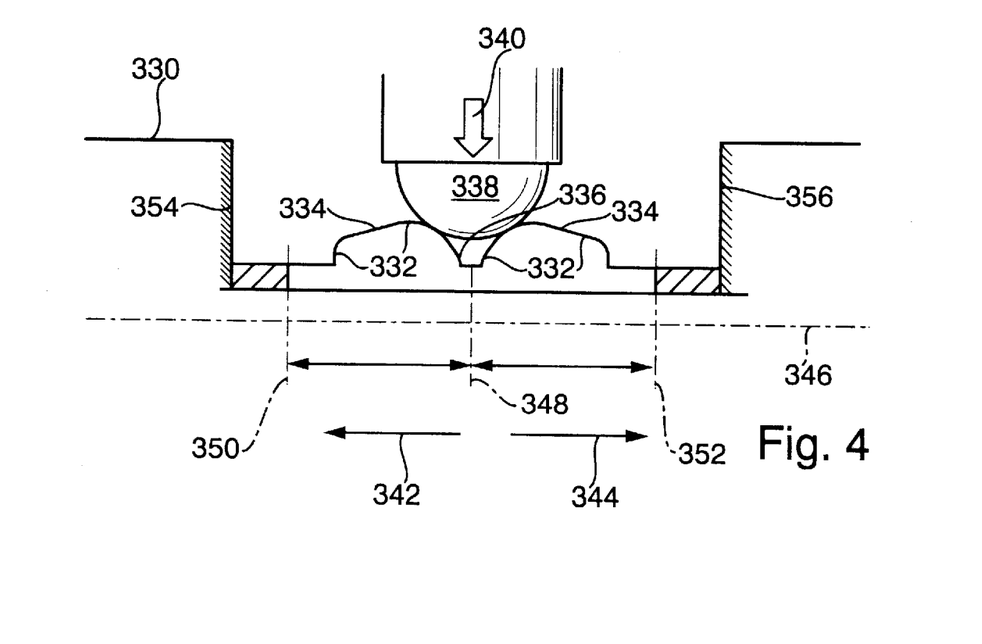
FIG. 4 represents a fourth exemplary embodiment of the invention in a schematic view.

FIG. 4 gives a schematic view of a second movable element 330, in this particular case a shifter shaft, with a surface contour 332 that has raised portions 334 and depressed portions 336. A spring-loaded contact element 338 applies a force against the surface contour 332, with the direction of the force being schematically indicated by the arrow 340. When shifting gears, the second movable element moves in one of the directions indicated by the arrows 342, 344.

In the same or a different embodiment of the invention, the second movable element, i.e., the shifter shaft 330, turns about its longitudinal axis 346 when shifting gears. In this case the surface contour 332 can also have raised and depressed portions in a circumferential direction, i.e., in a cross-section perpendicular to the axis 346.

In each of the shift positions indicated by dash-dotted vertical lines 348, 350, 352, the spring-loaded contact element 338 is at a local minimum of potential energy. In the positions 350 and 352, the spring-loaded contact element 338 is positively positioned between one of the limit stops 354, 356 and one of the raised portions 334.

Figure 5:
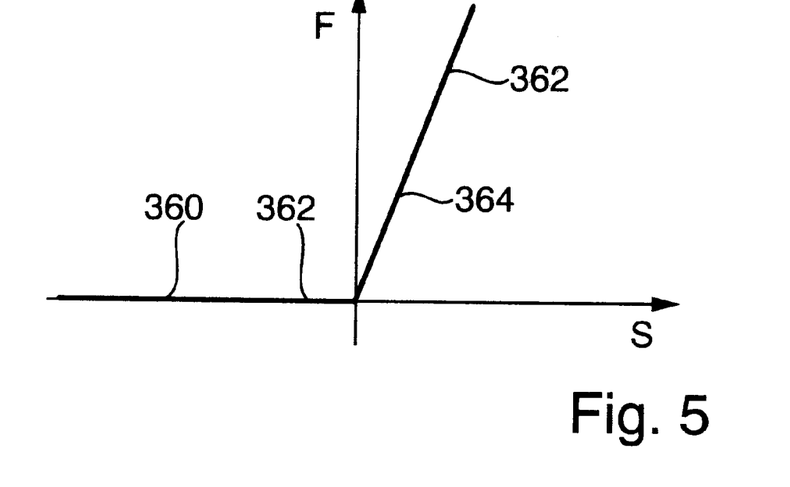
FIG. 5 represents a first graph of a force F acting on a movable part of the transmission device in function of a travel position s of the movable part.

FIG. 5 represents a graph 362 of a force F that opposes a movable element as a function of the travel position s of the element. In the illustrated trivial example, the movable element travels first in a range 360 with no resistance to the movement, i.e., the opposing force equals zero. As the movable element runs against a limit stop, the force rises steeply in the range 364, indicating a strong resistance to further movement.

Figure 6:
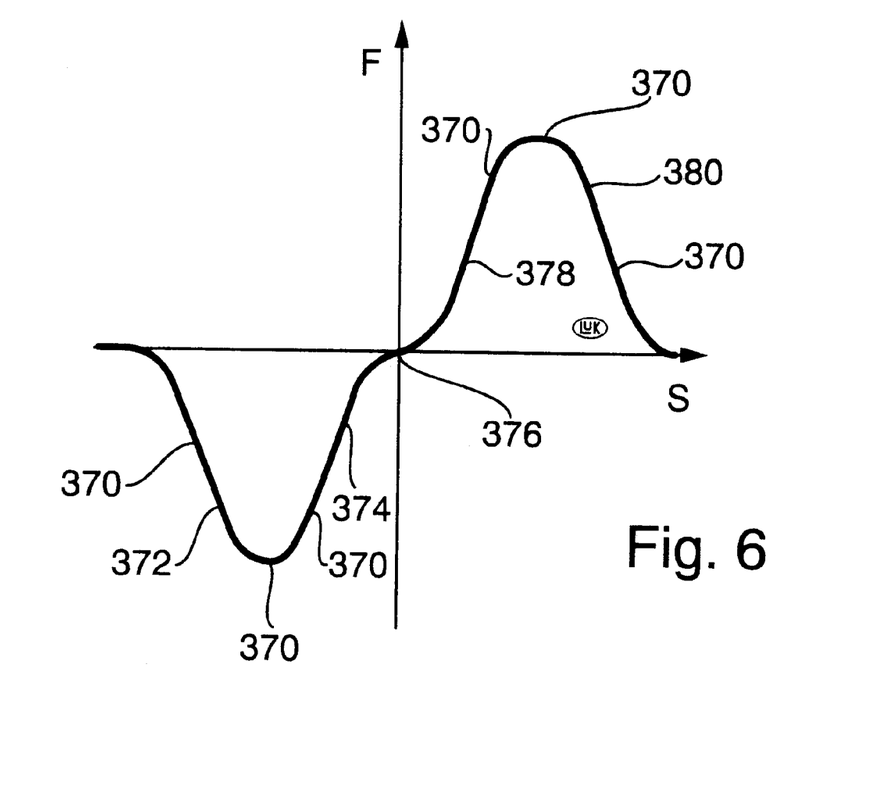
FIG. 6 represents a second graph of a force F acting on a movable part of the transmission device in function of a travel position s of the movable part.

The graph 370 of FIG. 6, in contrast to the graph 362 of FIG. 5, illustrates a non-trivial case where the movable element has a surface contour with raised and depressed portions interacting with a spring-loaded contact element 338 (see FIG. 4). The negative resistance force in the portion 372, 374 of the graph 370 indicates a travel phase of the movable element where the spring-loaded contact element 338 approaches a depression in the contour, i.e., the force is promoting rather than resisting the movement during the approach phase. The point 376 represents the lowest point of the depression, where the force turns positive, i.e., resisting a further movement past the depression. In the graph portion 378, 380, where the spring-loaded element moves up the contour ramp and leaves the depression, the resistance force is positive, so that a corresponding actuator force is required to overcome the resistance. The beginning and end of the graph where the curve runs at zero correspond to flat portions where the surface contour neither rises nor falls.

Of course, the detail shape of the graph 370 depends on the particular surface profile in the vicinity of a contour depression.

Figure 7:
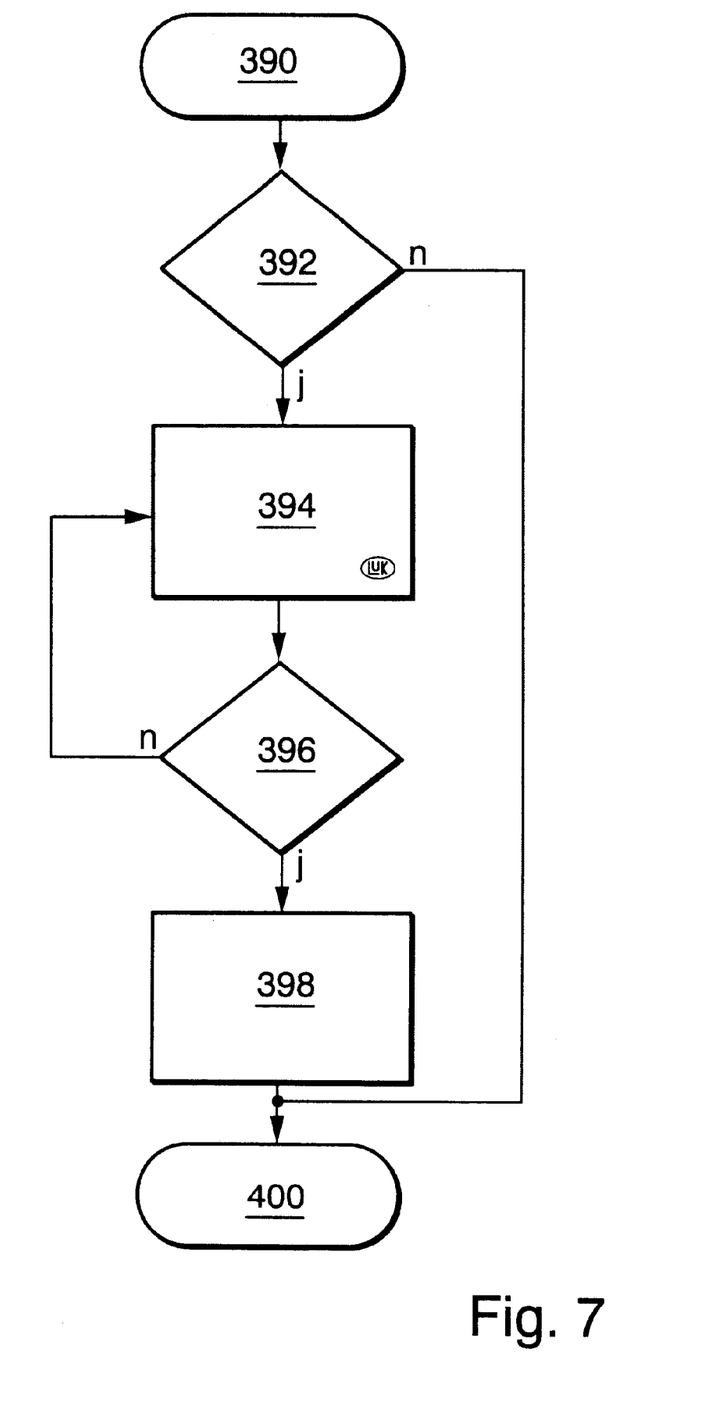
FIG. 7 represents a first example of a flow chart of a method in accordance with the invention.

FIG. 7 represents a flowchart to illustrate an example of the inventive method, starting at step 390. Step 392 represents a test to determine if a movable element under the influence of an actuator force is at a limit stop or within a given second tolerance band of a targeted shift position.

In the negative case (where neither of the criteria in step 392 is met), the method proceeds directly to the end at step 400.

In the affirmative case (where at least one of the criteria of step 392 is met), the method proceeds to step 394. In step 394, a stall-releasing signal is generated, causing a small voltage of, e.g., 0.5 volt to 1.0 volt to be applied to the actuator device that drives the movable element. In the case of a limit stop, the polarity of the voltage is controlled so that the movable element is urged away from the stop. The stall-releasing voltage serves to overcome the holding force or holding torque or any other stalling or friction effect in the electric motor or actuator, and to move the element in a desired direction.

Step 396 represents a test to determine whether the stall-releasing signal has been in effect for a predetermined length of time. In the negative case, the method loops back to step 394. In the affirmative case, the stall-releasing signal is turned off in step 398, and the process ends at step 400.

Figure 8:
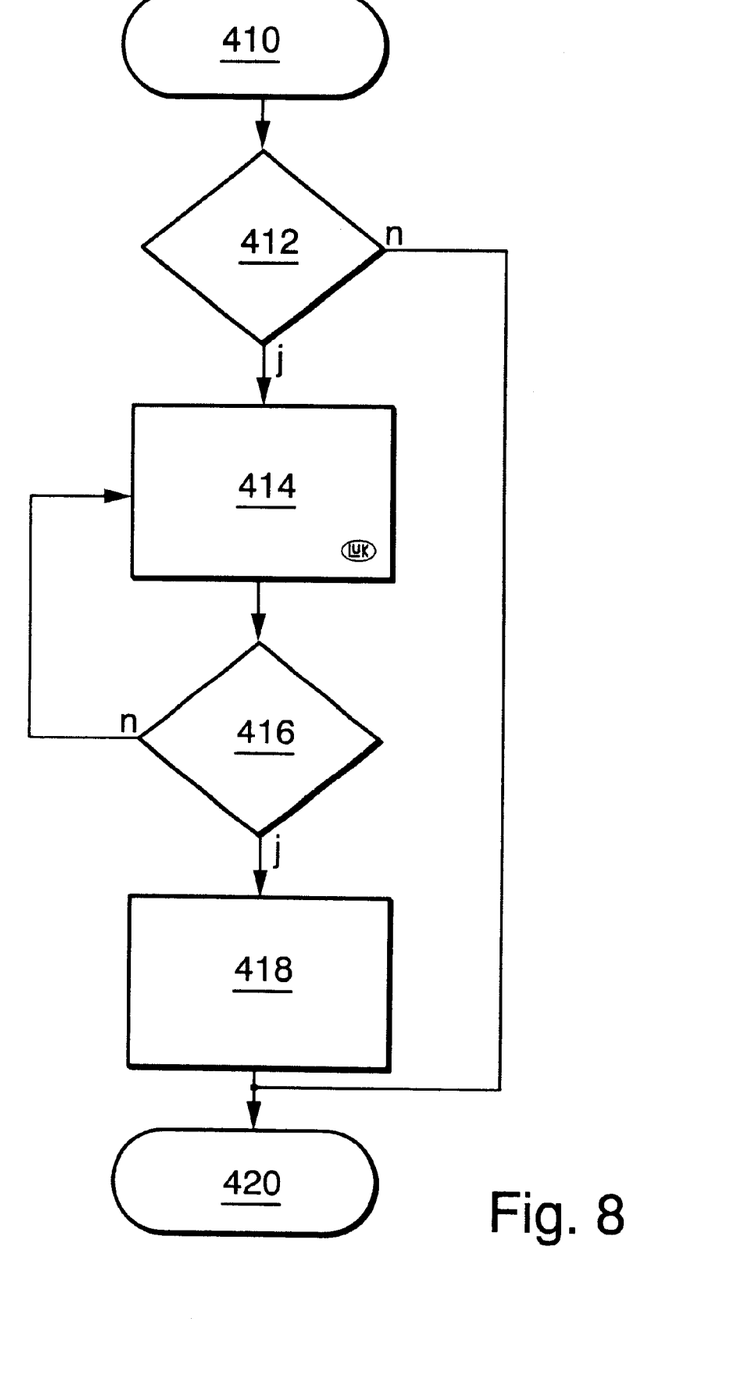
FIG. 8 represents a second example of a flow chart of a method in accordance with the invention.

FIG. 8 represents a flowchart to illustrate a further example of the inventive method, starting at step 410. Step 412 represents a test to determine if a movable element under the influence of an actuator force is at, or close to, a predetermined targeted shift position, specifically within a given second tolerance band of the targeted shift position. In the negative case (where the foregoing criterion is not met), the method proceeds directly to the end at step 420.

In the affirmative case (where the criterion of step 412 is met), the method proceeds to step 414. In step 414, the control device generates voltage pulses of alternating polarity, which are applied to an electric motor that drives the movable element.

Step 416 represents a test to determine whether the position or velocity of the movable element or a component coupled to the movable element, or a position-related signal such as a current or voltage of the control device or the electric motor is essentially oscillating about a null position. In the negative case, the method loops back to step 414. In the affirmative case, the stall-releasing signal of alternating pulses is turned off in step 418, and the process ends at step 420.

Figure 9:
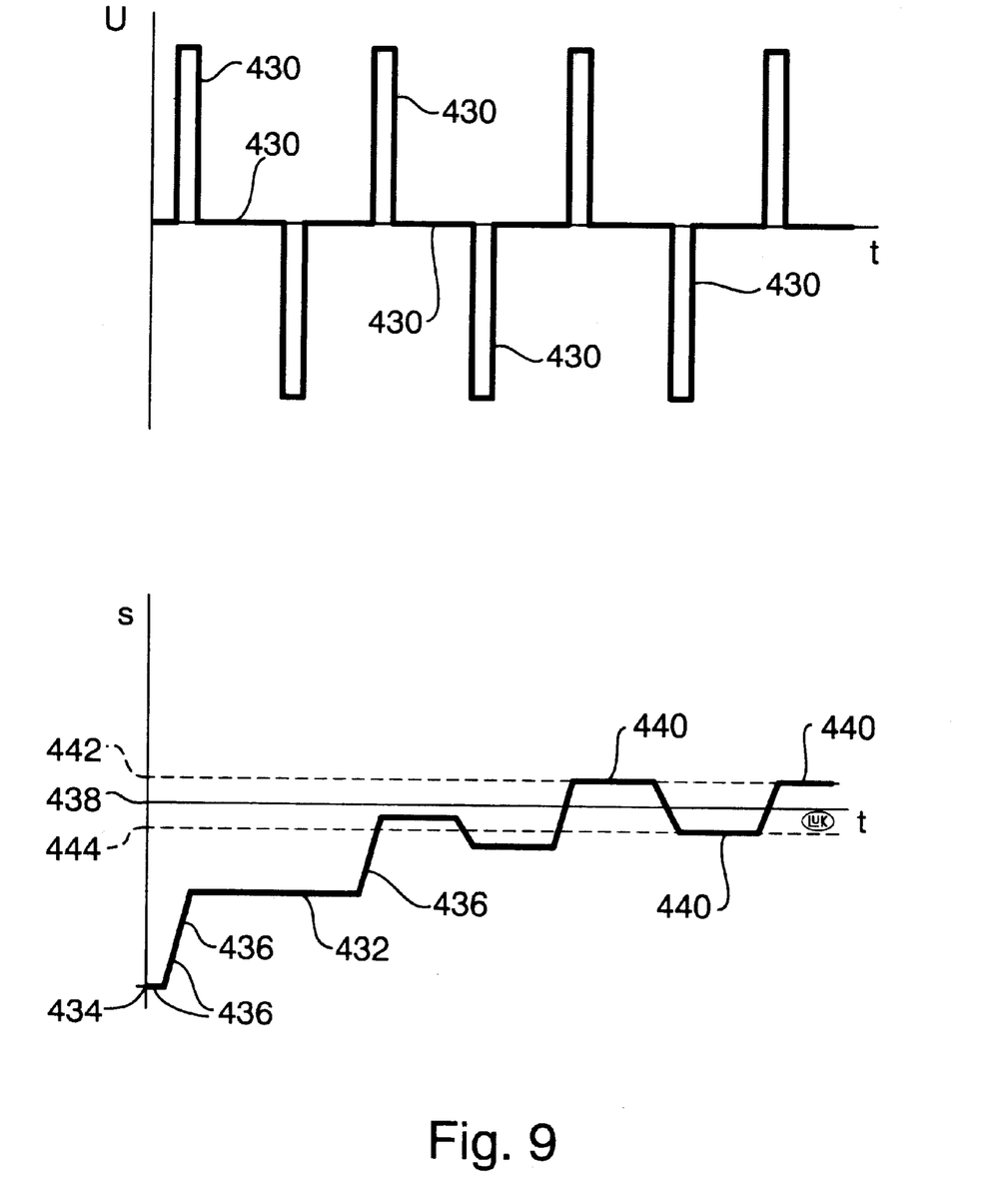
FIG. 9 represents graphs of voltage versus time, and travel position versus time, for a movable part of a transmission device, to illustrate typical traits of the inventive method.

The first graph of FIG. 9 represents a sequence of voltage pulses 430 of alternating polarity that are applied as a stall-releasing signal to the electric motor as described above in the context of FIG. 8.

The second graph of FIG. 9 represents a time profile 432 of the position s of a movable element that is driven by an electric motor receiving the voltage pulses 430. The movable element is initially at the position 434, which is known to be within a second tolerance band of a targeted shift position. It should be pointed out, however, that it is not necessary to know whether the precise targeted position has already been reached.

As a result of the first stall-releasing pulse 430, the movable element breaks loose from its stalled condition and moves by a step 436 towards the position 438. The next-following negative pulse 430 does not cause a reverse movement because the pulse is too small to work against the mechanical force bias generated by the spring-loaded contact element and the contoured surface. The next-following positive pulse 430, because it works in the same direction as the mechanical force bias, brings the movable element another step 436 closer to the position 438. In the portions 440 of the graph 432, the movable element has settled into an oscillation between the positions 442 and 444, symmetrically bracketing the position 438. In this phase, the conclusion can be drawn, either after a predetermined length of time or after reaching symmetrical high and low values 440 for a predetermined number of times, that the movable element is oscillating about a contour depression or position of minimum potential energy. Provided the contour depression is of a symmetrical shape, the center position 438 of the oscillation corresponds to the center of the contour depression, i.e., to the targeted shift position.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the afore described contribution to the art and, therefore, such adaptations should and are intended to be comprehended within the meaning and range of equivalence of the appended claims.

What is claimed is:

1. A method of operating a torque transfer system in a motor vehicle; said torque transfer system including a shifter device with a movable element that is movable into a plurality of shift positions, an actuator device operable to apply an actuating force to the movable element, a control device to control the actuator device, and a position-detecting device to detect a position of the movable element; wherein said shift positions comprise positions of minimum potential energy, so that the movable element will have a tendency to fall into a nearest one of said shift positions; the method comprising the steps of:

generating an output signal from the control device to the actuator device with the end purpose of moving the movable element to a position within a first tolerance band of a targeted shift position;

ceasing to generate said output signal when the movable element has arrived within a second tolerance band that is wider than and includes the first tolerance band, said second tolerance band representing a range of positions where said tendency will at least attempt to cause the movable element to move into and settle within the first tolerance band.

2. The method of claim 1, wherein the first tolerance band represents a substantially unbiased rest condition of the movable element.

3. The method of claim 1, wherein the targeted shift position comprises one of a limit stop position of a shift gate, an unbiased engagement position for a gear level, and a neutral position of a transmission device.

4. The method of claim 1, wherein the torque transfer system comprises at least one of a clutch device and a transmission device.

5. The method of claim 1, comprising the further step of generating a stall-releasing signal from the control device to the actuator device if the movable element has stopped moving within the second tolerance band, said stall-releasing signal serving to apply a stall-releasing force to the movable element to at least partially overcome a holding force of the movable element, so that said tendency will cause the movable element to move into and settle within the first tolerance band.

6. The method of claim 5, wherein a condition where the movable element has stopped moving within a second tolerance band is indicated by the position-detecting device.

7. The method of claim 6, wherein the stall-releasing signal is generated when the position-detecting device has indicated that the movable element is substantially within the first tolerance band.

8. The method of claim 6, wherein the stall-releasing signal is generated when the position-detecting device has indicated that the movable element is positioned at a limit stop near the targeted shift position.

9. The method of claim 5, wherein a characteristic value of the torque transfer system is monitored and evaluated, and the stall-releasing signal is generated when said characteristic value meets a predetermined condition.

10. The method of claim 9, wherein the predetermined condition comprises at least one of the criteria that the characteristic value has increased longer than a predetermined time interval, and by more than a predetermined amount, and if it has been ascertained that the movable element is at least near the targeted shift position.

11. The method of claim 9, wherein the predetermined condition comprises at least one of the criteria that the characteristic value has decreased longer than a predetermined time interval, and by more than a predetermined amount, and if it has been ascertained that the movable element is at least near the targeted shift position.

12. The method of claim 9, wherein the predetermined condition comprises that the characteristic value has passed through one of said areas of minimum potential energy.

13. The method of claim 9, wherein the characteristic value comprises the position of the movable element.

14. The method of claim 9, wherein the predetermined condition comprises that the movable element is outside of one of said areas of minimum potential energy.

15. The method of claim 5, wherein the stall-releasing force acts on the movable element at least initially in a direction corresponding to a last preceding movement of the movable element prior to the stall-releasing signal.

16. The method of claim 5, wherein the stall-releasing force acts on the movable element at least initially in an opposite direction relative to a last preceding movement of the movable element prior to the stall-releasing signal.

17. The method of claim 5, wherein the stall-releasing force acts on the movable element at least initially in a direction towards the targeted shift position.

18. The method of claim 5, wherein if the targeted shift position is near a limit stop and the movable element has run up against said limit stop, the stall-releasing force acts on the movable element at least initially in a direction pointing away from the limit stop.

19. The method of claim 5, wherein the stall-releasing signal comprises one of an electrical signal and a hydraulic signal.

20. The method of claim 19, wherein the stall-releasing signal comprises substantially a time period of continuous flow of the stall-releasing signal.

21. The method of claim 20, wherein said time period is of a substantially predetermined length and the stall-releasing force is of a magnitude not exceeding the holding force.

22. The method of claim 20, wherein the stall-releasing signal comprises an electrical signal to an electric motor of the actuator device, said electric motor being operable to generate the stall-releasing force.

23. The method of claim 22, wherein the electrical signal comprises a voltage between 0.3 volt and 2.5 volt.

24. The method of claim 23, wherein the voltage is smaller than a threshold voltage required to set the electric motor in motion.

25. The method of claim 19, wherein the stall-releasing signal comprises a pulse signal.

26. The method of claim 25, wherein the pulse signal comprises a series of signal pulses of alternating polarity.

27. The method of claim 26, wherein the stall-releasing force comprises force pulses of alternatingly opposite direction.

28. The method of claim 27, wherein the signal pulses have a constant signal-pulse magnitude and the force pulses have a constant force-pulse magnitude.

29. The method of claim 27, wherein the signal pulses and the force pulses within a time length of one stall-releasing signal have a substantially constant repetition interval.

30. The method of claim 27, wherein the signal pulses drive an electric motor of the actuator device, said electric motor being operable to generate the force pulses of alternatingly opposite direction.

31. The method of claim 28, wherein the stall-releasing signal is turned off when the position-detecting element has detected that the movable element is moving back and forth between a first position and a second position and has attained at least one of said first position and said second position at least twice in a row.

32. The method of claim 27, wherein the signal pulses are characterized by a product of pulse height and pulse width and said product is predetermined substantially dependent on at least one predetermined characteristic parameter.

33. The method of claim 32, wherein the at least one predetermined characteristic parameter comprises at least one of a friction force of the movable element and a gradient of the potential energy.

34. The method of claim 5, wherein the position-detecting device detects said current position while the stall-releasing signal is in effect.

35. The method of claim 5, wherein the method further comprises at least one of the steps of checking the position-detecting device, and of adjusting the position-detecting device, and said at least one of the steps is performed at a time when one of the targeted shift positions has been attained after a stall-releasing signal.

36. The method of claim 35, wherein the method further comprises an emergency strategy that is initiated under certain conditions and according to which the method is performed a plurality of successive times for moving the movable element into different predetermined targeted shift positions identified by a running index k that is incremented from 1 to n in steps of 1.

37. The method of claim 1, wherein the potential energy comprises the potential of a position-dependent force.

38. The method of claim 37, wherein the position-dependent force is generated by a surface contour of the movable element interacting with a spring-loaded contact element, the latter exerting a contact force against the surface contour, and wherein the position-dependent force consists of a component of the contact force in a direction in which the movable element is capable of moving.

39. The method of claim 38, wherein the targeted shift position corresponds to a depression in the surface contour.

40. A torque transfer system operable to perform the method according to claim 1.

41. The torque transfer system according to claim 40, comprising an automated shift transmission, wherein said shift positions correspond to transmission ratios of the automated shift transmission.

42. The torque transfer system according to claim 40, comprising at least one clutch device, wherein said shift positions correspond to degrees of engagement of the at least one clutch device.

43. The torque transfer system according to claim 40, comprising a shift gate arrangement defining a shift path of the movable element, wherein the movable element is coupled to a shift-actuating element having a contour surface with raised and depressed portions, and wherein the torque transfer system has a spring-loaded contact element interacting with the contour surface and thereby generating a position-dependent force which at least in part defines a field of potential energy associated with the position.

* * * * *